United States Patent Office 3,366,695
Patented Jan. 30, 1968

3,366,695
HYDROGENATION OF BENZYLIC COMPOUNDS
Allan J. Lundeen, Ponca City, Okla., assignor to Continental Oil Company, Ponca City, Okla., a corporation of Delaware
No Drawing. Filed Jan. 6, 1964, Ser. No. 336,020
12 Claims. (Cl. 260—617)

This invention relates to the hydrogenation of benzylic compounds, such as phenyl ethyl alcohol and acetophenone, to cyclohexyl compounds in the presence of Group VIII, Series 6 metal catalysts.

It is known to hydrogenate benzylic compounds, such as phenyl methyl carbinol, acetophenone and the like, to the corresponding saturated cyclohexyl compounds using catalysts such as ruthenium, rhodium or palladium on a porous support. However, these processes are characterized by relative low yields; cycloparaffins are produced as a reaction byproduct.

Cyclohexyl methyl carbinol obtained by hydrogenating either phenyl methyl carbinol or acetophenone is a starting material for the production of vinyl cyclohexane, which is of interest for polymer and copolymer production.

An object of the invention is a process wherein benzylic compounds having oxygen functions in the benzylic position are hydrogenated without substantial loss of the oxygen function, i.e., a high yield process. Other objects will become apparent in the course of the detailed description of the invention.

It has been discovered in the hydrogenation of the benzylic compounds; phenyl carbinol, phenyl alkyl carbinols, phenyl alkyl ketones, benzyl alkyl ethers, and benzyl alkanoates in the presence of a catalyst of ruthenium, or rhodium on a porous support that the yield distribution is significantly improved by having present on the catalyst an alkaline material.

This process is applicable to phenyl carbinol; the phenyl alkyl carbinols such as phenyl methyl carbinol (phenyl ethyl alcohol) and the like; phenyl alkyl ketones such as acetophenone (phenyl methyl ketone), phenyl-n-propyl ketone and the like; benzyl alkyl ethers such as benzyl methyl ether, benzyl ethyl ether and the like; and benzyl alkanoates such as benzyl acetate, benzyl butyrate, and the like. It is preferred that the alkyl group have 1–4 carbon atoms, and the alkanoate affording acid have 1–4 carbon atoms.

The catalyst comprises ruthenium or rhodium mounted on a porous support, such as charcoal, alumina or silica. It may include any of the modifiers and/or promoters known for use with these metals in hydrogenation processes.

The improved catalyst includes an alkaline material—organic or inorganic. Typical alkaline materials are the alkai metal hydroxides, such as sodium hydroxide; the alkali metal carbonates, such as sodium carbonate; and the alkyl amines, such as triethyl amine and dimethyl dodecyl amine.

In the process the hydrogenating agent is hydrogen gas, at elevated pressure preferably, or a hydrogen gas rich stream where the other gases are inert to the other reactants or the products.

The benzylic compound is maintained substantially in the liquid state while being contacted by the hydrogen gas and the catalyst.

Any hydrogenation temperature can be used. Normally the improved process is carried out at about 50–150° C., and commonly about 90°–105° C.

Preferably the reaction is continued until all, or essentially all, of the benzylic compound charged has been hydrogenated to cyclohexyl materials. The byproducts are cyclohexyl paraffins which can be separated from the desired product(s) by distillation.

ILLUSTRATIONS

The process of the invention is illustrated by and compared with conventional processes by the following runs. These runs were carried out in a commercial 300 ml. Magne-Dash autoclave; temperature was maintained by immersing the charged autoclave in a constant temperature bath. Means were provided for adding continuously cylinder hydrogen gas to the autoclave. The rate of hydrogen absorption was determined periodically by closing the gas inlet valve and measuring the pressure drop in the autoclave; then the inlet valve was opened and the pressure brought back to the desired level. The reaction was complete when no more hydrogen absorption was detectable. The product mixture was analyzed by gas chromatography and the structure of the products determined by infra red inspection. Here the products from acetophenone were entirely ethylcyclohexane and cyclohexyl methyl carbinol.

Commercial c.p. phenyl methyl carbinol was used. In one set of runs there was used a commercial catalyst consisting of 5 weight percent of elemental ruthenium supported on activated charcoal; in the other set of runs, there was used a commercial catalyst consisting of 5 weight percent of elemental rhodium on activated charcoal.

The set of runs using ruthenium catalyst is set out in Table I. These runs were carried out at 94° C. and at a hydrogen pressure of 400 p.s.i.g.

TABLE I.—HYDROGENATION OF ACETOPHENONE

| Run No. | Ruthenium catalyst; 94° C.; 400 p.s.i.g. Hydrogen gas | | | |
|---|---|---|---|---|
| | Catalyst (1), grams | Time, Hrs. | H₂ Take-up (2) | Yield (3) |
| 1(4) | 1 | ca. 16 | | 87 |
| 2 | 1 | 5.0 | 11 | 77 |
| 3 | 1.5 | 3.5 | 23 | 70 |
| 4 | 3 | 3.0 | 21 | 83 |
| 5 | 1.5 (5) | 3.5 | 85 | 99 |
| 6 | 3 (5) | 0.5 | 120 | 98 |
| 7 | 3 (5) | 0.8 | 125 | 99 |
| 8 | 3 (6) | 1.2 | 72 | 70 |
| 9(7) | 1.5 (8) | 2.0 | 33 | 92 |
| 10 | 3 (9) | 1.0 | 67 | 97 |

(1) Unless otherwise noted, commercial product having 5% Ru on charcoal.
(2) Hydrogen pressure drop/minute.
(3) Cyclohexyl methyl carbinol.
(4) All runs except No. 9: 50 ml. of acetophenone charged.
(5) 1 ml. of 20% NaOH mixed with catalyst (1).
(6) Acetophenone washed with 5% KOH before being charged.
(7) 30 ml. of acetophenone charged.
(8) 1 ml. of 10% sodium carbonate mixed with catalyst (1).
(9) 0.25 ml. of dimethyldodecyl amine mixed with catalyst (1).

In runs 1–4 using the commercial ruthenium catalyst, as is, the maximum yield of the desired cyclohexyl methyl carbinol was 87% and the maximum hydrogen absorption rate was 23.

In runs 5–7, 9 and 10 the alkaline material was mixed with the commercial catalyst before the catalyst was charged to the reactor.

In run 8 the acetophenone was shaken with 5% aqueous KOH and the acetophenone containing some occluded solution was charged to the reactor along with the commercial catalyst. Even with the very small amount of alkaline material available in the run, the absorption rate was greately increased and the yield-time relation was much better than in comparison runs 1–4.

Runs 5–7 and 10 establish that virtually complete conversion to the desired product is obtainable with a simultaneous great decrease in recation time, over the best results of runs 1–4 with the commercial catalyst alone.

The set of runs using rhodium catalyst is set out in Table II.

TABLE II.—HYDROGENATION OF ACETOPHENONE

| Run No. | Rhodium catalyst; 94° C., 400 p.s.i.g. Hydrogen | | | |
| --- | --- | --- | --- | --- |
| | Catalyst, grams | Time, Hrs. | H₂ Take-up (1) | Yield (2) |
| 11 | 3 (3) | 0.5 | 250 | 65 |
| 12 | 3 (4) | 1.7 | 90 | 98 |
| 13 | 3 (5) | 1.5 | 130 | 76 |

(1) Hydrogen pressure drop/minute.
(2) Cyclohexyl methyl carbinol, percent.
(3) Commercial product having 5% Rh on charcoal.
(4) 1 ml. of 20% NaOH mixed with catalyst (3).
(5) 1 ml. of 10% sodium carbonate mixed with catalyst (3).

Runs 12 and 13 establish a large improvement in yield of the desired product when the alkaline material is present. Contrary to the ruthenium catalyst results, rhodium catalyst and alkaline material show a decrease in hydrogen absorption rate.

Thus having described the invention what is claimed is:

1. A process for preparing certain cyclohexyl compounds which process comprises: reacting hydrogen gas and a member selected from the class consisting of phenyl carbinol, phenyl alkyl carbinol, phenyl alkyl ketone, benzyl alkyl ether and benzyl alkanoates wherein said alkyl groups in phenyl alkyl carbinol, phenyl alkyl ketone, and benzyl alkyl ether and said alkanoate group each have 1–4 carbon atoms, substantially in the liquid state and in the presence of a catalyst consisting essentially of a porous support, a promotional amount of an alkaline material selected from the group consisting of alkali metal hydroxide, alkali metal carbonate, and alkyl amine on said support, and a metal selected from the class consisting of ruthenium and rhodium on said support.

2. The process of claim 1 where said alkaline material is alkali metal hydroxide.

3. The process of claim 1 where said alkaline material is alkali metal carbonate.

4. The process of claim 1 where said alkaline material is alkyl amine.

5. The process of claim 1 wherein said alkaline material is sodium hydroxide.

6. The process of claim 1 wherein said alkaline material is sodium carbonate.

7. The process of claim 1 wherein said alkaline material is dimethyldodecylamine.

8. The process of claim 1 wherein said support is selected from the class consisting of charcoal alumina and silica.

9. The process of claim 1 wherein said reaction is at a temperature of about 50–150° C.

10. A process for preparing cyclohexyl methyl carbinol which process comprises: reacting hydrogen gas, at elevated pressure, with acetophenone, at a temperature of about 100° C., in the presence of a catalyst consisting essentially of ruthenium and a promotional amount of sodium hydroxide mounted on a porous support.

11. A process for preparing cyclohexyl methyl carbinol which process comprises: reacting hydrogen gas, at elevated pressure with acetophenone at a temperature of about 100° C., in the presence of a catalyst consisting essentially of ruthenium and a promotional amount of dimethyldodecylamine mounted on a charcoal support.

12. A process for preparing cyclohexyl methyl carbinol which process comprises: reacting hydrogen gas, at elevated pressure, with acetophenone, at a temperature of about 100° C., in the presence of a catalyst consisting essentially of rhodium and a promotional amount of sodium hydroxide mounted on a charcoal support.

References Cited

UNITED STATES PATENTS

| | | | |
| --- | --- | --- | --- |
| 2,105,664 | 1/1938 | Lazier | 260—617 |
| 2,614,107 | 10/1952 | Wender et al. | 260—617 X |
| 2,908,722 | 10/1959 | Casey | 260—618 X |
| 3,055,840 | 9/1962 | Koch | 252—443 |
| 3,193,584 | 7/1965 | Rylander et al. | 260—617 X |
| 2,555,912 | 6/1951 | Arnold | 260—617 |
| 2,675,390 | 4/1954 | Rosenblatt | 260—631 X |
| 2,847,463 | 8/1958 | Toland et al. | 260—617 X |
| 2,854,487 | 9/1958 | Quin | 260—617 X |

BERNARD HELFIN, Primary Examiner.

LEON ZITVER, Examiner.

T. G. DILLAHUNTY, Assistant Examiner.